United States Patent
Chavez

(10) Patent No.: US 10,470,006 B2
(45) Date of Patent: Nov. 5, 2019

(54) METHOD AND SYSTEM FOR ALTERED ALERTING

(71) Applicant: Avaya Inc., Santa Clara, CA (US)

(72) Inventor: David Chavez, Broomfield, CO (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 15/877,111

(22) Filed: Jan. 22, 2018

(65) Prior Publication Data

US 2019/0230482 A1    Jul. 25, 2019

(51) Int. Cl.
*H04W 4/12* (2009.01)
*H04M 1/725* (2006.01)
*H04W 4/30* (2018.01)
*H04W 4/50* (2018.01)

(52) U.S. Cl.
CPC ......... *H04W 4/12* (2013.01); *H04M 1/72547* (2013.01); *H04W 4/30* (2018.02); *H04W 4/50* (2018.02)

(58) Field of Classification Search
CPC ........... H04W 4/12; H04W 4/50; H04W 4/30; H04M 1/72547
See application file for complete search history.

(56) References Cited

U.S. PATENT DOCUMENTS

| | | |
|---|---|---|
| 6,400,810 B1 | 6/2002 | Skladman et al. |
| 8,935,347 B2 | 1/2015 | Cohen et al. |
| 2010/0144310 A1* | 6/2010 | Bedingfield, Sr. ........................... H04L 12/1417 455/405 |
| 2012/0225652 A1 | 9/2012 | Martinez et al. |
| 2014/0057667 A1 | 2/2014 | Blankenship et al. |
| 2018/0054346 A1* | 2/2018 | Hambridge ........... H04L 41/048 |
| 2018/0353852 A1* | 12/2018 | Chia ....................... G06F 1/163 |

* cited by examiner

*Primary Examiner* — Chuong A Ngo
(74) *Attorney, Agent, or Firm* — Sheridan Ross P.C.

(57) ABSTRACT

The methods and systems of the present disclosure can configure, by a microprocessor, a message from a sending user to a recipient device; set, by the microprocessor, a reduced alert for the message, where the reduced alert is set by the sending user; and send the message to the recipient device, wherein the recipient device provides the reduced alert upon receipt of the message.

20 Claims, 6 Drawing Sheets

METHOD AND SYSTEM FOR ALTERED ALERTING

FIELD

The disclosure relates generally to communications and particularly to alerting preferences for telecommunication systems.

BACKGROUND

In communications systems, people have the ability to contact and communicate with other people. For example, a calling party has the ability to communicate by placing a voice call to a called party. Similarly, an emailing party has the ability to send an email message to someone else, a text-messaging party has the ability to send a text message to someone else, and so forth.

Many people have the ability to not only receive phone calls on mobile devices, but also to receive other communications and notifications, such as email, instant messages, messages from social media applications, etc. When communications are received at the user's mobile device, the recipient is often notified in some manner on their mobile device and possibly other devices. The nature and type of notifications have historically been definable by the recipient. Examples of notification options historically available to recipients includes, without limitation, a visual, audible, and/or haptic alert from the device(s).

SUMMARY

However, a person (also referred to herein as a party and/or a user) sending communications may not want to disturb the recipient when the recipient's device(s) receives the communication, so the sending person may wish to provide a lower level or an altered level of alert for the communication, or no alert at all at the recipient's device(s).

In embodiments disclosed herein, communicating parties have the ability to provide alternative treatment for one or more outgoing communications, so that a receiving party (or receiving parties) have an altered or reduced alert or notification for the communication, or no alert at all.

For example, there are times when a user should not allow messaging alerts to interrupt, including but not limited to when the user is participating in a highly sensitive meeting or the user is working at a sensitive location. Even when a user is not in a sensitive situation or environment, alerts from messages can be annoying, for example they may negatively affect productivity. Historically speaking, the recipient user has been allowed to set their alerting/notification preferences—possibly to a less intrusive alert/notification when they find themselves in such a sensitive environment. Such functionality has yet to be extended to a sending user (who may know that the recipient is in a sensitive environment and, therefore, does not want to be intrusive). Embodiments of the present disclosure extend the ability to alter alerting preferences for a recipient out to a sending user thereby enabling the sending user to define an alerting/notification preference that is less intrusive for the recipient as compared to a current alerting/notification preference set by the recipient.

Additionally, a person who wants to reach the user (e.g., an assistant, a co-worker, or a friend) may not want to interrupt the user via certain communication channels, or the person may want to convey a message that does not require immediate attention but that carries some importance. Problematically, the person may unintentionally interrupt the receiving user with a message alert or the person may hesitate to send a message that should be conveyed for fear of creating a problem for or distracting the receiving user. Prior to embodiments of the present disclosure, a user would employ email for non-urgent matters and Instant Messaging (IM) and/or a voice/video call for urgent matters. However, as disclosed herein, reduced or altered alerts as defined by the sending user may provide advantages. For example, a notification having no noise but with blinking LEDs and/or vibration can provide quiet (but still indicating) visual and/or haptic messaging alerts. Also, in various embodiments, a user can send a message that allows only one notification per message rather than two or more, and can disable all notification types in some applications.

Embodiments disclosed herein can advantageously address such problems by providing a message delivery system that enables senders to control the priority of message alerts and/or notifications for the receiving user(s) and also enables senders to not have to rely only on text for real-time, immediate messaging and email for non-immediate messaging. For example, non-essential messaging can be controlled by a sender such that the messaging has no alert or indication of arrival at the receiving device(s) when received but then appear when an interface is opened by the receiving user.

Embodiments herein can provide the ability to craft a message whereby the originator/sender of the message can designate the message to be silent (as used herein, silent messages can include messages with altered and/or reduced alerts as compared to the receiving user's alerting/notification preferences). After the message is transmitted and once it is received by the recipient on one or more receiving devices, the silent message may not create or provide any auditory, visual, or haptic indication and it may not give an indication unless the recipient is in the dialog window with the originator/sender. Otherwise, the message can show up when the recipient checks his messages on his own, and not in response to any message indication.

In various embodiments, a silent or reduced alert message can provide a low-priority messaging capability so that the recipient can use the messaging client as a ubiquitous channel and not just as a channel for high-priority messaging. This disclosure gives the recipient experiential dimensions to accomplish that. Embodiments may be implemented with a Rich Communication Services (RCS) environment.

In various embodiments, silent messages (including messages having reduced alerts) can override existing set user preferences of a user receiving the message(s), or silent messages (including messages having reduced alerts) can include not overriding existing set user preferences. Additionally, a partial override can be done based on different criteria, such as a user being on a recipient's very important person (VIP) list. Silent messages can be dedicated to a messaging channel on a messaging client, but do not have to be media-specific.

Examples include an assistant being able to let an executive know that a meeting that he wanted set up has been set up through a messaging channel with a chosen appropriate priority, where the assistant does not have to worry that the executive will be disturbed with an alert because the message is sent silently. Also, a man may have a wife at work and kids at school. He may want to leave all three of them a message about after-school plans, but he does not want to interrupt her work or their classes. He sends silent messages to each of them, which they will retrieve once they are free. In another example, an engineer may be at a customer site and the customer is upset because a server has gone down. The engineer has asked her co-workers not to send any alerting messages since the customer is angry and demanding her full attention. Her co-worker orders box lunches for the team and sends a silent message about where and when the box lunches will be available. The engineer can then check her messages when appropriate while considering the angry customer's tolerance and needs.

Thus, embodiments can advantageously avoid forcing a sender or recipient to use email as a low-priority background communication and one or more messaging clients only for high-priority distribution and allows the sender to control priority. Therefore, silent messages, including messages having altered and reduced alerts, can extend the value of the messaging client.

These and other needs are addressed by the various aspects, embodiments, and/or configurations of the present disclosure. The present disclosure is directed to altering alerts for communications. Systems and methods can provide low-priority background communication using existing messaging channels to deliver messages based on desired priorities of the sender without active notification, and can provide an alert when a client is opened and/or accessed.

Embodiments of the present disclosure are directed towards methods including: configuring, by a microprocessor, a message from a sending user to a recipient device; setting, by the microprocessor, a reduced alert for the message, where the reduced alert is set by the sending user; and sending the message to the recipient device, where the recipient device provides the reduced alert upon receipt of the message.

The reduced alert can be an audible alert that is quieter than a default audible alert set to sound by a receiving user of the recipient device upon receipt of messages. The reduced alert can be a haptic alert only and a default audible alert that is set to sound by a receiving user of the recipient device upon receipt of messages does not sound upon the receipt of the message. The reduced alert can be a visual alert devoid of an audible alert, where the visual alert lights up a Light Emitting Diode. The reduced alert can be a haptic alert and the reduced alert can further include a delayed visual alert, where the delayed visual alert occurs upon an application associated with viewing the message being accessed on the recipient device. The methods can further include determining location information of recipient device, and the setting of the reduced alert can be based on the location information. The methods can further include accessing presence information of a second user, where the recipient device is associated with the second user, and where the setting of the reduced alert is based on the presence information. The methods can further include where if the location information includes a first location, the reduced alert is a first type of alert, and if the location information includes a second location distinct from the first location, the reduced alert is a second type of alert.

Embodiments of the present disclosure are directed towards systems including: one or more processors; memory storing one or more programs for execution by the one or more processors, the one or more programs including instructions for: configuring a message from a sending user to a recipient device; setting a reduced alert for the message, wherein the reduced alert is set by the sending user; and sending the message to the recipient device, where the recipient device provides the reduced alert upon receipt of the message.

Embodiments of the present disclosure are directed towards tangible and non-transient computer readable mediums comprising microprocessor executable instructions that, when executed by the microprocessor, perform at least the following functions: configure a message from a sending user to a recipient device; set a reduced alert for the message, where the reduced alert is set by the sending user; and send the message to the recipient device, where the recipient device provides the reduced alert upon receipt of the message.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "communication event" and its inflected forms includes: (i) a voice communication event, including but not limited to a voice telephone call or session, the event being in a voice media format, or (ii) a visual communication event, the event being in a video media format or an image-based media format, or (iii) a textual communication event, including but not limited to instant messaging, internet relay chat, e-mail, short-message-service, Usenet-like postings, etc., the event being in a text media format, or (iv) any combination of (i), (ii), and (iii).

The term "computer-readable medium" refers to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

A "database" is an organized collection of data held in a computer. The data is typically organized to model relevant aspects of reality (for example, the availability of specific types of inventory), in a way that supports processes requiring this information (for example, finding a specified type of inventory). The organization schema or model for the data can, for example, be hierarchical, network, relational, entity-relationship, object, document, XML, entity-attribute-value model, star schema, object-relational, associative, multidimensional, multivalue, semantic, and other database designs. Database types include, for example, active, cloud, data warehouse, deductive, distributed, document-oriented, embedded, end-user, federated, graph, hypertext, hypermedia, in-memory, knowledge base, mobile, operational, parallel, probabilistic, real-time, spatial, temporal, terminology-oriented, and unstructured databases. "Database management systems" (DBMSs) are specially designed applications that interact with the user, other applications, and the database itself to capture and analyze data.

The terms "determine", "calculate" and "compute," and variations thereof, are used interchangeably and include any type of methodology, process, mathematical operation or technique.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

An "enterprise" refers to a business and/or governmental organization, such as a corporation, partnership, joint venture, agency, military branch, and the like.

A "geographic information system" (GIS) is a system to capture, store, manipulate, analyze, manage, and present all types of geographical data. A GIS can be thought of as a system—it digitally makes and "manipulates" spatial areas that may be jurisdictional, purpose, or application-oriented. In a general sense, GIS describes any information system that integrates, stores, edits, analyzes, shares, and displays geographic information for informing decision making.

The terms "instant message" and "instant messaging" refer to a form of real-time text communication between two or more people, typically based on typed text. Instant messaging can be a communication event.

The term "internet search engine" refers to a web search engine designed to search for information on the World Wide Web and FTP servers. The search results are generally presented in a list of results often referred to as SERPS, or "search engine results pages". The information may consist of web pages, images, information and other types of files. Some search engines also mine data available in databases or open directories. Web search engines work by storing information about many web pages, which they retrieve from the html itself. These pages are retrieved by a Web crawler (sometimes also known as a spider)—an automated Web browser which follows every link on the site. The contents of each page are then analyzed to determine how it should be indexed (for example, words are extracted from the titles, headings, or special fields called meta tags). Data about web pages are stored in an index database for use in later queries. Some search engines, such as Google™, store all or part of the source page (referred to as a cache) as well as information about the web pages, whereas others, such as AltaVista™, store every word of every page they find.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

A "server" is a computational system (e.g., having both software and suitable computer hardware) to respond to requests across a computer network to provide, or assist in providing, a network service. Servers can be run on a dedicated computer, which is also often referred to as "the server", but many networked computers are capable of hosting servers. In many cases, a computer can provide several services and have several servers running. Servers commonly operate within a client-server architecture, in which servers are computer programs running to serve the requests of other programs, namely the clients. The clients typically connect to the server through the network but may run on the same computer. In the context of Internet Protocol (IP) networking, a server is often a program that operates as a socket listener. An alternative model, the peer-to-peer networking module, enables all computers to act as either a server or client, as needed. Servers often provide essential services across a network, either to private users inside a large organization or to public users via the Internet.

The term "social network" refers to a web-based social network maintained by a social network service. A social network is an online community of people, who share interests and/or activities or who are interested in exploring the interests and activities of others.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
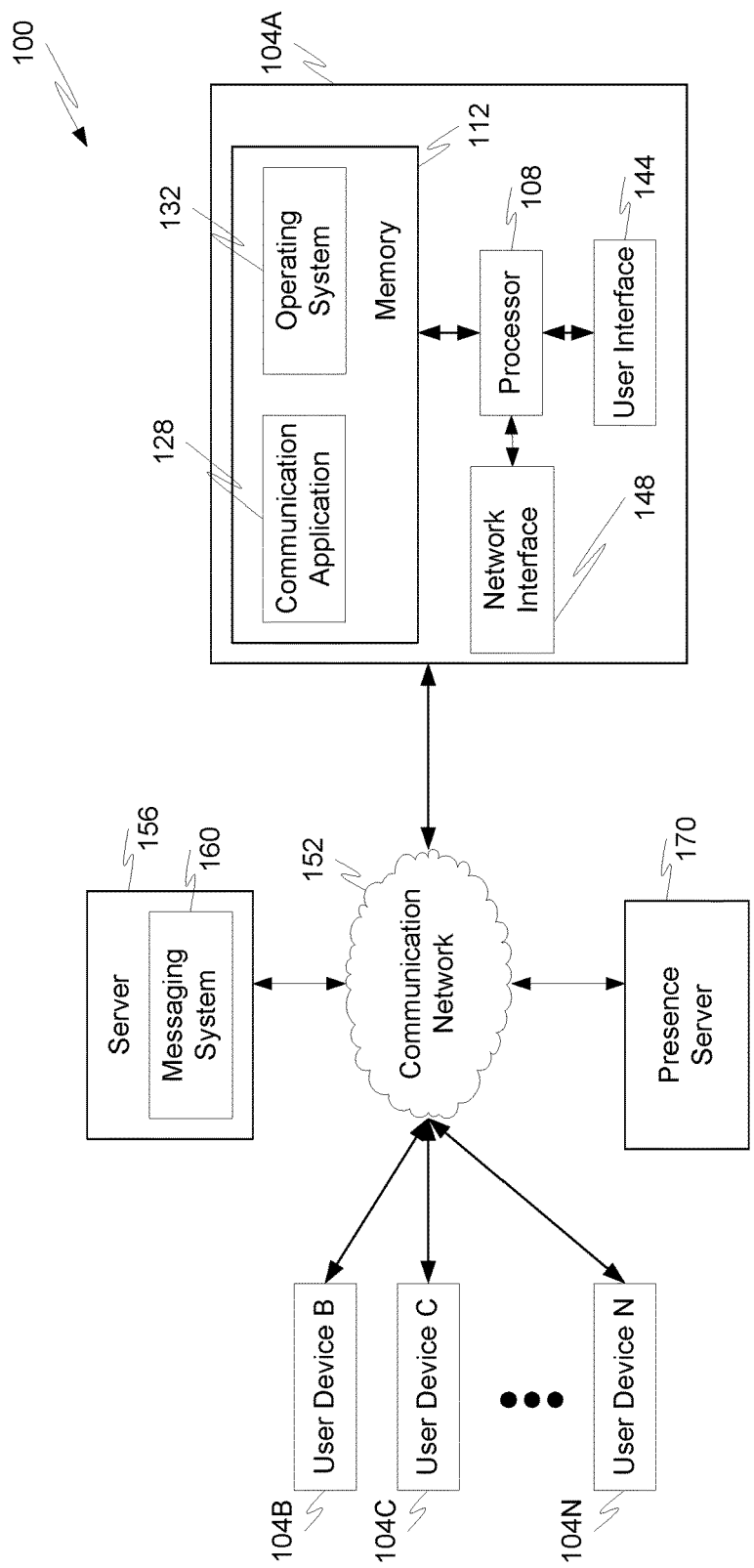
FIG. 1 is a block diagram of a communications system according to an embodiment of the disclosure.

A communication system 100 including a user device 104A capable of allowing a user to interact with other user devices 104B and 104C through 104N via a communication network 152 is shown in FIG. 1. The depicted user device 104A includes a processor 108, a memory 112, a user interface 144, and a network interface 148. Although the details of only one user device 104A are depicted in FIG. 1, one skilled in the art will appreciate that some or all of the other user devices 104B and 104 C through 104N may be equipped with similar or identical components as the user device 104A depicted in detail. The systems described herein can send communications having an altered or reduced alert. The system can selectively send messages where the messages have an altered or reduced alert. The system can send such messages at any timing, including individually or simultaneously.

The communication network 152 and user devices 104 can support rich communication services (RCS) as defined by the Global System for Mobile Communications Association (GSMA). For example, user devices 104A, 104B and 104C through 104N may be connected to a network operator's core network via a variety of connection methods. These may include $2^{nd}$ Generation (2G) General Packet Radio Service (GPRS), 3rd Generation (3G) GPRS, High Speed Packet Access/Evolved High Speed Packet Access (HSPA/HSPA+), Wi-Fi, Broadband Access (BA) or $4^{th}$ Generation (4G), such as Wi-Max or Long Term Evolution (LTE). The devices may include any device suitable for IP communications such as a mobile telephone device that is portable, a mobile telephone device implementing a stationary telephone, a personal digital assistant (PDA), a computer, a tablet, a gateway, etc., or any other type of user equipment (UE). The communication network 152 can be implemented by any type(s) and/or number communications networks, such as, for example, a 3GPP LTE network and/or any other type of network having RCS support.

The user interface 144 may include a user input and/or user output device. The user interface 144 can enable a user or multiple users to interact with the user device 104A. Exemplary user input devices which may be included in the user interface 144 comprise, without limitation, a microphone, a button, a mouse, trackball, rollerball, or any other known type of user input device. Exemplary user output devices which may be included in the user interface 144 comprise, without limitation, a speaker, light, Light Emitting Diode (LED), display screen, buzzer, or any other known type of user output device. In some embodiments, the user interface 144 includes a combined user input and user output device such as a touch-screen.

The processor 108 may include a microprocessor, Central Processing Unit (CPU), a collection of processing units capable of performing serial or parallel data processing functions, and the like.

The memory 112 may include a number of applications or executable instructions that are readable and executable by the processor 108. For example, the memory 112 may include instructions in the form of one or more modules and/or applications. The memory 112 may also include data and rules in the form of one or more alert setting that can be used by one or more of the modules and/or applications described herein. Exemplary applications include an operating system 132 and various other applications, such as a communication application 128. The operating system 132 is a high-level application which enables the various other applications and modules to interface with the hardware components (e.g., processor 108, network interface 148, and user interface 144) of the user device 104A. The operating system 132 also enables a user or users of the user device 104A to view and access the applications and modules in memory 112 as well as any alert settings.

Although the applications and modules are depicted as software instructions residing in memory 112 and those instructions are executable by the processor 108, one skilled in the art will appreciate that the applications and modules may be implemented partially or totally as hardware or firmware. For example, an Application Specific Integrated Circuit (ASIC) may be utilized to implement some or all of the functionality discussed herein.

Exemplary features offered by the communication application 128 include, without limitation, communication features (e.g., voice communication applications, text communication applications, video communication applications, multimedia communication applications, etc.), web-browsing features, word-processing features, and so on.

In some embodiments, the communication application 128 includes the ability to facilitate real-time communications between the user device 104 and other user devices 104 across the communication network 152. The communication application 128 may facilitate a two-party communication session or a multi-party communication session. For example, the communication application 128 may include functions to support certain types of communications such as voice communications, text communications, IM communications, video communications, and multi-media communications. In some embodiments, the communication application 128 may make use of a conference bridge or mixer that is located either on the user device 104 or some external server (e.g., at server 156).

In some embodiments, an external server is a server that is administered by a third-party service, meaning that the entity which administers the external server is not the same entity that either owns or administers a user device. In some embodiments, an external server may be administered by the same enterprise that owns or administers a user device. As one particular example, a user device may be provided in an enterprise network and an external server may also be provided in the same enterprise network. As a possible implementation of this scenario, the external server may be configured as an adjunct to an enterprise firewall system, which may be contained in a gateway or Session Border Controller (SBC) which connects the enterprise network to a larger unsecured and untrusted communication network. An example of a messaging server is a unified messaging server that consolidates and manages multiple types, forms, or modalities of messages, such as voice mail, email, short-message-service text message, instant message, video call, and the like.

Although various modules and data structures for disclosed methods and systems are depicted as residing on the user device 104A, one skilled in the art can appreciate that one, some, or all of the depicted components of the user device 104A may be provided by other software or hardware components. For example, one, some, or all of the depicted components of the user device 104A may be provided by an alert system 160 which is operating on a server 156. Also, one, some, or all of the depicted components of the user device 104A may be provided by one or more applications operating on a presence server 170. Further, the logic of server 156 can be provided on the user device(s) 104A-N (e.g., one or more of the user device(s) 104A-N may include logic for the methods and systems disclosed herein so that the methods and systems are performed at the user device(s) 104A-N). In embodiments, the user device(s) 104A-N can perform the methods disclosed herein without use of logic on the server 156. A presence server 170 can be a network service which accepts, stores and distributes presence information. Presence information is a status indicator that conveys an ability and willingness of a user to communicate. A user's user device can provide presence information (e.g., presence state) via a network connection to a presence server, which can be stored in what constitutes a personal availability record (called a presentity) and can be made available for distribution to other users (called watchers) to convey availability for communication. This feature may be useful where a user is unaware of another user's activities. Thus, a user may receive an indication of availability for another user and such an indication may be used in configuring alerts for a communication. Also, a presence server may invoke alert type profiles to be chosen when a specified user is at a certain location or with certain people based on the specified user's presence information.

The memory 112 may also include a communication module, instead of one or more communication-based applications, such as communication application 128, which provides the communication functionality of the user device 104A. In particular, the communication module may contain the functionality necessary to enable the user device 104A to communicate with other user devices 104B and 104 C through 104N across the communication network 152. As such, the communication module may have the ability to access communication preferences, including alert preferences, maintained within a locally-stored or remotely-stored profile, format communication packets for transmission via the network interface 148, as well as condition communication packets received at a network interface 148 for further processing by the processor 108. For example, locally-stored communication preferences may be stored at a user device 104A-N. Remotely-stored communication preferences may be stored at a server, such as server 156.

The network interface 148 comprises components for connecting the user device 104 to a communication network. In some embodiments, a single network interface 148 connects the user device to multiple networks. In some embodiments, a single network interface 148 connects the user device 104A to one network and an alternative network interface is provided to connect the user device 104A to another network.

The network interface 148 may comprise a communication modem, a communication port, or any other type of device adapted to condition packets for transmission across a communication network 152 to one or more destination user devices 104B, and/or 104C through 104N, as well as condition received packets for processing by the processor 108. Examples of network interfaces include, without limitation, a network interface card, a wireless transceiver, a modem, a wired telephony port, a serial or parallel data port, a radio frequency broadcast transceiver, a USB port, or other wired or wireless communication network interfaces.

The type of network interface 148 utilized may vary according to the type of network which the user device 104A is connected, if at all. Exemplary communication networks 152 to which the user device 104A may connect via the network interface 148 include any type and any number of communication mediums and devices which are capable of supporting communication sessions, such as voice calls, video calls, chats, emails, TTY calls, multimedia sessions, or the like. In situations where the communication network 152 is composed of multiple networks, each of the multiple networks may be provided and maintained by different network service providers. Alternatively, two or more of the multiple networks in the communication network 152 may be provided and maintained by a common network service provider or a common enterprise in the case of a distributed enterprise network.

Exemplary types of communication networks 152 include, without limitation, a Local Area Network (LAN), multiple LANs, a Wide Area Network (WAN), an enhanced IP-based network, a circuit-switched network, a Session Initiation Protocol (SIP) network, the Internet, the Public Switched Telephone Network (PSTN), a Plain Old Telephone System (POTS) network, an Integrated Serviced Digital Network (ISDN), a cellular communications network (e.g., 3G, 4G, etc.), an IP Multimedia Subsystem (IMS) network, or the like. Communication networks 152 can include technologies for provisioning communication services over the Internet, such as Voice over Internet Protocol (VoIP). In addition, it can be appreciated that the communication network 152 need not be limited to any one network type, and instead may be comprised of a number of different networks and/or network types.

In various embodiments, an IP Multimedia Sub-System (IMS) may be in communication with the communication network 152. The IMS can provide a form of Fixed-Mobile Convergence (FMC) which aids the communication of multimedia and voice applications from wireless to fixed terminals. Additionally, in communication with the communication network 152 there may be multiple servers (such as server 156 and/or presence server 170) which can provide facilities and storage for services.

For example, RCS and IMS can use the SIP protocol in order to control communications sessions over IP. Once sessions have been initiated, other protocols may be used to facilitate communication, such as the message session relay protocol (MSRP) or Relay Transfer Protocol (RTP). MSRP can be used in RCS for instant messaging, file transfer and image sharing while RTP is used for video sharing. Although it is described herein that these protocols and services may be used in the exemplary embodiments of the present disclosure, it should be understood that any suitable protocols may be used in the concepts of the present disclosure (e.g., SMS, email, or other protocols).

As can be appreciated by one skilled in the art, functions offered by the modules depicted in FIG. 1 may be implemented in one or more network devices (i.e., servers, networked user device, non-networked user device, etc.).

Figure 2:
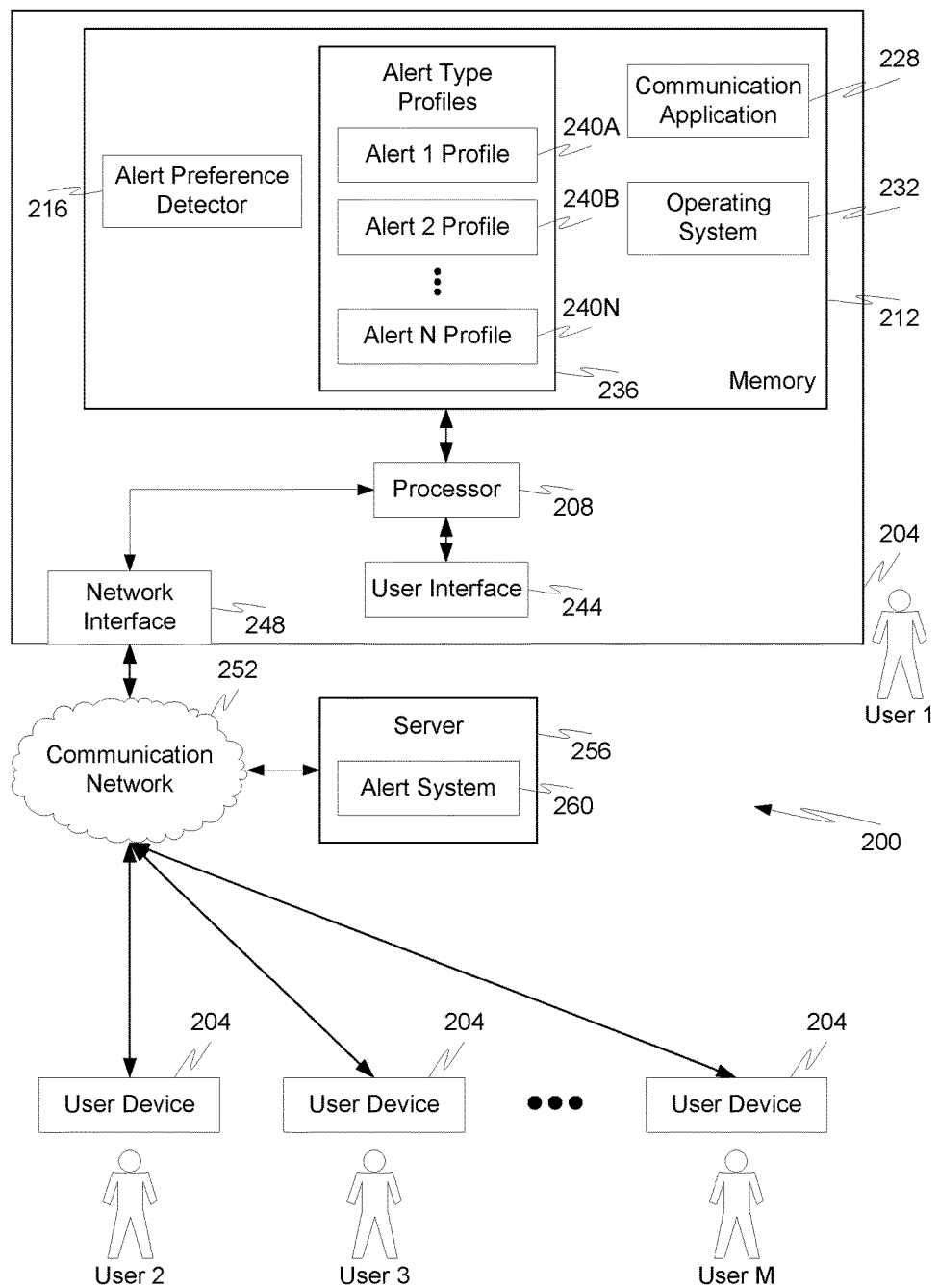
FIG. 2 is a block diagram of functional components in a communications system according to an embodiment of the disclosure.

A communication system 200 including a user device 204 capable of allowing a user to interact with other user devices 204 via a communication network 252 is shown in FIG. 2. The depicted user device 204 includes a processor 208, memory 212, a user interface 244, and a network interface 248. Although the details of only one user device 204 are depicted in FIG. 2, one skilled in the art will appreciate that some or all of the other user devices 204 may be equipped with similar or identical components as the user device 204 depicted in detail.

The user interface 244 may include one or more user input and/or one or more user output device. The user interface 244 can enable a user or multiple users to interact with the user device 204. Exemplary user input devices which may be included in the user interface 244 comprise, without limitation, a microphone, a button, a mouse, trackball, rollerball, or any other known type of user input device. Exemplary user output devices which may be included in the user interface 244 comprise, without limitation, a speaker, light, Light Emitting Diode (LED), display screen, buzzer, or any other known type of user output device. In some embodiments, the user interface 244 includes a combined user input and user output device such as a touch-screen.

The processor 208 may include a microprocessor, Central Processing Unit (CPU), a collection of processing units capable of performing serial or parallel data processing functions, and the like.

The memory 212 may include a number of applications or executable instructions that are readable and executable by the processor 208. For example, the memory 212 may include instructions in the form of one or more modules and/or applications. The memory 212 may also include data and rules in the form of one or more alert type profiles 240a-N which can be used by one or more of the modules and/or applications described herein. Exemplary applications include an operating system 232 and various other applications, such as a communication application 228. The operating system 232 is a high-level application which enables the various other applications and modules to interface with the hardware components (e.g., processor 208, network interface 248, and user interface 244) of the user device 204. The operating system 232 also enables a user or users of the user device 204 to view and access the applications and modules in memory 212 as well as alert type profiles 240a-N contained in memory 212.

Although the applications and modules are depicted as software instructions residing in memory 212 and those instructions are executable by the processor 208, one skilled in the art will appreciate that the applications and modules may be implemented partially or totally as hardware or firmware. For example, an Application Specific Integrated Circuit (ASIC) may be utilized to implement some or all of the functionality discussed herein.

Exemplary features offered by the communication application 228 include, without limitation, communication features (e.g., voice communication applications, text communication applications, video communication applications, multimedia communication applications, etc.), web-browsing features, word-processing features, and so on.

In some embodiments, the communication application 228 includes the ability to facilitate real-time communications between the user device 204 and other user devices 204 across the communication network 252. The communication application 228 may facilitate a two-party communication session or a multi-party communication session. For example, the communication application 228 may include functions to support certain types of communications such as voice communications, text communications, IM communications, video communications, and multi-media communications. In some embodiments, the communication application 228 may make use of a conference bridge or mixer that is located either on the user device 204 or some external server.

Specific applications which may be included in memory 212 include, without limitation, an alert preference detector 216.

The alert preference detector 216 provides the user device 204 with the ability to determine a user's alert preferences of a far-end user (i.e., a user utilizing a far-end user device 204 which is separated from the user device 204 that originally received a user input, also referred to as a near-end user device, by a communication network 252). When invoked, the alert preference detector 216 may refer to the alert type profiles 236 maintained locally on the user device 204. This alert type profiles 236 may contain various alert types (alert 1 profile 240A and alert 2 profile 240B through alert N profile 240N) for the user utilizing the user device 204 (i.e., user 1). The alert type profiles 236 are optional and may be used in any manner in various embodiments disclosed herein. In embodiments, the types of alerts that the user may select from for setting alerts for a communication are saved as alert type profiles 236. In embodiments, the types of alerts that may be displayed as a user's alert preferences may be saved as alert type profiles 236.

Alert preferences for far-end users may be obtained, for example, by transmitting a query for such information to the user device 204 being utilized by the far-end user. As another example, alert preferences for far-end users may be obtained, for example, by transmitting a query for such information to a server. Once alert preferences have been obtained for a particular user, those preferences may be maintained in the user device 204 for a predetermined amount of time or indefinitely. The exchange of alert preferences between user devices 204 may be done automatically upon initiation of a communication session (e.g., during a handshake protocol or during the exchange of SIP INVITE, OK, and/or ACK messages) and transparently, such that the users are unaware of the exchange protocol.

The automated exchange of alert preferences may be controlled by a user, if desired, such that alert preferences are not exchanged unless certain criteria are satisfied. Exemplary conditions imposed prior to allowing an exchange of alert preferences include, without limitation, receiving user permission, certifying that the requesting user is trusted or within a particular group, and so on.

In some embodiments, the alert preferences of the various users may be maintained locally, for example for far-end users that are known to have frequent communication interactions with the user of the near-end user device 204 (e.g., has frequent communication sessions, as determined by any criteria). Also, alert preferences of another far-end user that only appears in the near-end user's call log once in the last week may be deleted. The rules for maintaining the alert preferences of various users may be provisioned by the user or may be automatically provisioned as part of the operating parameters of the alert preference detection 216.

In some embodiments, a sending user can define one or more alerting preferences (e.g., a reduced alerting preference) without knowing a current alerting preference of a receiving user's device. For example, the sending user could define "no alert" or "flash light" for a communication sent to the receiving device without knowing what current preference is set on the receiving device. Also, a sending user can define, at the sending device, an alert that reduces an intrusiveness of the alert to a least intrusive (or reduces an intrusiveness of the alert to be less intrusive than a current alerting preference). A sending user can define alerting preferences without knowing any alerting preferences on the receiving end at a receiving device. The receiving device can apply whatever preference (reduced or otherwise) is defined by the sending device. In embodiments, the receiving and/or sending users my not have to negotiate or share alerting preferences between devices.

In some embodiments, a receiving user can define one or more alerting preferences (e.g., a reduced alerting preference) on the receiving end at a receiving device. For example, a receiving user can set an alerting preference at the receiving end to allow reduced notifications by senders if the reduced notification(s) is defined by the senders. Thus, there can be some control by a receiving user, such as being able to define normal alerting preferences while opening up their system at least partially to the sender user. In embodiments, the receiving and/or sending users my not have to negotiate or share alerting preferences between devices.

In some embodiments, a user may have multiple alert type profiles 240A-N. In some embodiments, a user may define each alert type profile as having a different type or volume of alert (or set of alerts). Such alert profiles may be the same across multiple communication modality types (e.g., email, text messaging, specific application messaging, voice call, video call, etc.) or may vary according to a communication modality type. For example, a user may set a first alert profile for a first communication type (e.g., a voice call) and a second alert profile for a second communication type (e.g., text messaging). Alert type profiles may correspond to groups associated with the user, and a user may determine a ranking for different alerts based on preference, importance, presence information, and other criteria.

In some embodiments, the alert preference detector 216 may notify a far-end user that a user is requesting detection of the alert preferences of the far-end user, and request permissions from the far-end user to detect and share the alert preferences. The alert preference detector 216 may notify a user whether another user approves or denies sharing of alert preferences.

In some embodiments, the alert preference detector 216 may notify a contacting user that the far-end user has a certain alert preference or set of alert preferences. Such preferences may be displayed to the contacting user (e.g., as a visual option prior to sending a message, or as part of ringback or while a call is being established), thereby allowing the contacting user to quickly determine what alert they would like to use. This feature may be useful where the contacting user does not want to disturb a far-end user's activities. For example, a far-end user may be attending a work meeting or on a conference call and may not want a notification for the communication to sound or appear, unless the communication is urgent. Also, the contacting user may not be aware of the far-end user's activities at the time the communication is sent; however, the contacting user may know that their communication is a low priority, and may desire to have a lowered alert for the communication, or no alert at all. Thus, the communication may arrive at the far-end user's device with no indication to the far-end user, and the far-end user may only see the communication when the far end-user opens the application used by the communication.

Presentation of the alert preferences for the contacting (e.g., communicating) user to the far-end (e.g., contacted) user allows the contacted user to determine, prior to communicating with the far-end user, a desired alert type, even if that desired alert is not the contacting users' preferred alert type. The far-end user may set the desired alert type as the alert type to use for certain or all communications and the desired alert type may override any preferred alert type chosen by the contacting user. For example, user 1 may wish to send a text message communication to user 2; however, user 1 may not be aware of user 2's activities at the time of the communication. Thus, user 1 may send a communication as a silent message, having no alert with the communication only visible when the user opens the application associated with viewing the communication/message. User 1 may send communications with any type or number of alert(s) (e.g., visual, audible, haptic, etc.) or no alerts. Visual alerts can include a visual indication of the communication, such as words on the device, a symbol appearing on the device, a flashing or solid lit LED, etc. In embodiments, the alerts that accompany a communication may be delayed upon receipt, and they may occur based on any criteria. For example, a user may send a communication that has an alert that occurs only when the recipient unlocks their device, or opens an application associated with viewing the communication. Options such as these can help users communicate with less stress and greater ease.

Alerts chosen by a sending user may override other alerts that have been set by other users, or alerts that are set to be default to the device, or any other type of alerts that are set. Alternatively, alerts chosen by a sending user may be altered or ignored based on any criteria at any point in the process. For example, alerts may be set or altered based on a user's association with a position, a membership, or a group, based on a location or time of day, or based on a user's identity, among others.

Although various modules and data structures for disclosed methods and systems are depicted as residing on the user device 204, one skilled in the art can appreciate that one, some, or all of the depicted components of the user device 204 may be provided by an alert system 260 which is operating on an external server 256. In some embodiments, the external server 256 is administered by a third-party service meaning that the entity which administers the server 256 is not the same entity that either owns or administers the user device 204. In some embodiments, the server 256 may be administered by the same enterprise that owns or administers the user device 204. As one particular example, the user device 204 may be provided in an enterprise network and the server 256 may also be provided in the same enterprise network. As one possible implementation of this scenario, the server 256 may be configured as an adjunct to an enterprise firewall system which may be contained in a gateway or Session Border Controller (SBC) which connects the enterprise network to a larger unsecured and untrusted communication network 252.

The memory 212 may also include a communication module, instead of one or more communication-based applications 228, which provides the communication functionality of the user device 204. In particular, the communication module may contain the functionality necessary to enable the user device 204 to communicate with other user devices 204 across the communication network 252. As such, the communication module may have the ability to access user alert preferences maintained within a locally-stored profile 236 (or remotely-stored profile), format communication packets for transmission via the network interface 248, as well as condition communication packets received at a network interface 248 for further processing by the processor 208.

In some embodiments, the alert type profiles 240a-N are stored directly on the user device 204. In some embodiments, the alert type profiles 240a-N may be stored by the enterprise and pushed to the user device 204 on an as-needed basis. The remote storage of the alert type profiles 240a-N may occur on another user device or on a server. In some embodiments, a portion of the alert type profiles 240a-N are stored locally on the user device 204 and another portion of the alert type profiles 240a-N is stored at an enterprise and provided on an as-needed basis.

The network interface 248 comprises components for connecting the user device 204 to a communication network. In some embodiments, a single network interface 248 connects the user device to multiple networks. In some embodiments, a single network interface 248 connects the user device 204 to one network and an alternative network interface is provided to connect the user device 204 to another network.

The network interface 248 may comprise a communication modem, a communication port, or any other type of device adapted to condition packets for transmission across a communication network 252 to a destination user device 204 as well as condition received packets for processing by the processor 208. Examples of network interfaces include, without limitation, a network interface card, a wireless transceiver, a modem, a wired telephony port, a serial or parallel data port, a radio frequency broadcast transceiver, a USB port, or other wired or wireless communication network interfaces.

The type of network interface 248 utilized may vary according to the type of network which the user device 204 is connected, if at all. Exemplary communication networks 252 to which the user device 204 may connect via the network interface 248 include any type and any number of communication mediums and devices which are capable of supporting communication events (also referred to as "messages," "communications" and "communication sessions" herein), such as voice calls, video calls, chats, emails, TTY calls, multimedia sessions, or the like. In situations where the communication network 252 is composed of multiple networks, each of the multiple networks may be provided and maintained by different network service providers. Alternatively, two or more of the multiple networks in the communication network 252 may be provided and maintained by a common network service provider or a common enterprise in the case of a distributed enterprise network.

Exemplary types of communication networks 252 include, without limitation, a Local Area Network (LAN), multiple LANs, a Wide Area Network (WAN), an enhanced IP-based network, a circuit-switched network, a Session Initiation Protocol (SIP) network, the Internet, the Public Switched Telephone Network (PSTN), a Plain Old Telephone System (POTS) network, an Integrated Serviced Digital Network (ISDN), a cellular communications network (e.g., 3G, 4G, etc.), an IP Multimedia Subsystem (IMS) network, or the like. In addition, it can be appreciated that the communication network 260 need not be limited to any one network type, and instead may be comprised of a number of different networks and/or network types.

As can be appreciated by one skilled in the art, functions offered by the modules depicted in FIG. 2 may be implemented in one or more network devices (i.e., servers, networked user device, non-networked user device, etc.).

Although each user device 204 is depicted as being utilized by one user, one skilled in the art will appreciate that multiple users may share a single user device 204. In such a scenario, the alert preferences for each sharing user may be accounted for by the alert preference detection 216 and a common alert may be automatically selected for use by the group. However, it may also be possible to accommodate each user's utilization of a different alert by receiving a different inputs regarding, or from, individual users. This may allow the user device 204 to simultaneously accommodate communications for users that desire different alerts even when some users are in a group having a common alert. This may allow the user device 204 to simultaneously accommodate communications to users where the sending user desires to have the recipient users have different alerts for the communication, even when the communication is sent to the recipient users at a same time or forwarded to multiple recipient users.

Figure 3:
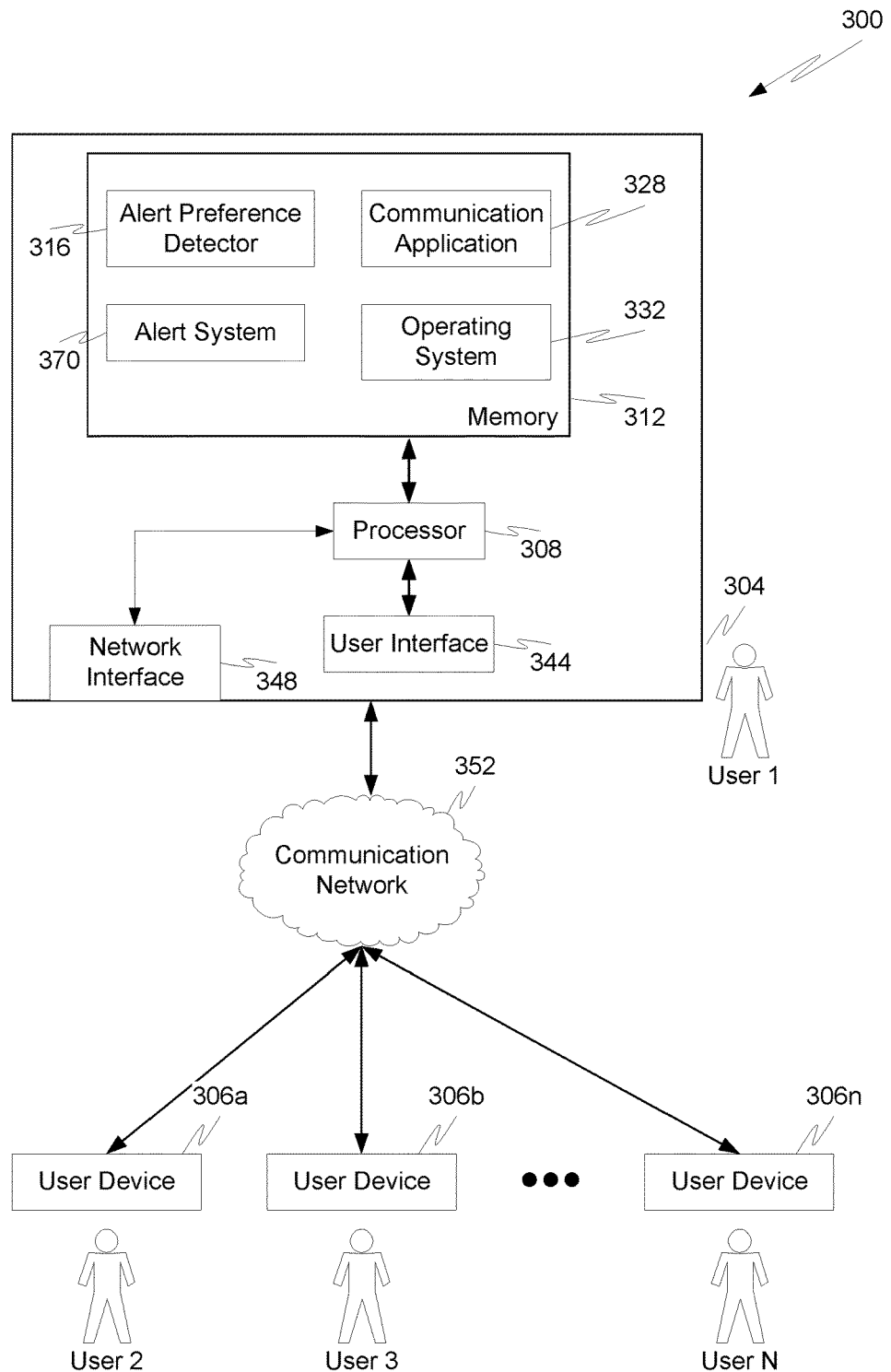
FIG. 3 is a block diagram of functional components in a communications system according to an embodiment of the disclosure.

A communication system 300 including a user device 304 capable of allowing a user to interact with other user devices 306a-n via a communication network 352 is shown in FIG. 3. The depicted user device 304 includes a processor 308, memory 312, a user interface 344, and a network interface 348, and the memory 312 includes an alert preference detector 316, an alert system 370, a communication application 328, and an operating system 332. Although the details of only one user device 304 are depicted in FIG. 3, one skilled in the art will appreciate that some or all of the other user devices 306a-n may be equipped with similar or identical components as the user device 304 depicted in detail. Components shown in FIG. 3 may correspond to those shown and described in FIG. 2.

When the user device 304 is a receiving user device (e.g., receiving a communication from one or more user devices 306a-n), a communication sent from a sending user device can have alerts for the communication altered by the alert system 370 such that the receiving device 304 modifies the alert preferences for the communication. In embodiments, the alert system 370 can perform some or all functionality of the altered alerts as described herein, and the alert system 370 can interact with other components (e.g., a server) to perform the functionality of the altered alerts as described herein.

For example, a receiving device can allow alerting for communications to be modified directly based on communications transmitted by a sending device. In embodiments, if the communication is a direct peer-to-peer (P2P) communication, then logic supporting the functionality of the altered alerting is in a receiving device or sending device. Also, logic supporting some or all of the functionality of the altered alerting can be communicated within a header of the communication (e.g., in a message or a call notification message such as a SIP invite or a VoIP payload).

Figure 4:
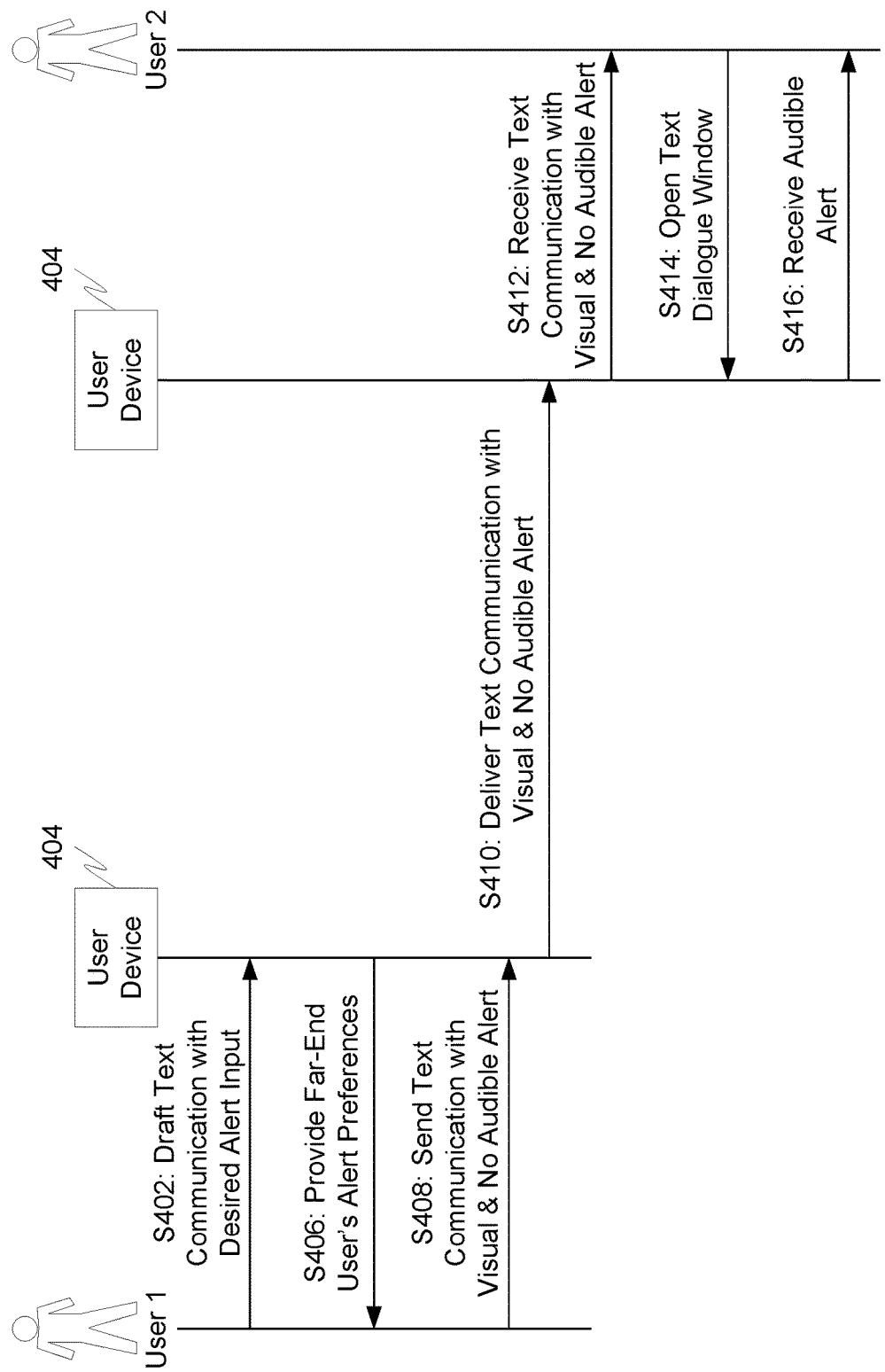
FIG. 4 is a logic flow chart according to an embodiment of the disclosure.

With reference now to FIG. 4, an exemplary logic flow chart will be described in accordance with at least some embodiments of the present invention. The method is initiated when a communication session is initiated or about to be initiated between two or more user devices 404 and a user 1 drafts a text communication with a desired alert input (step 402). User 1 may correspond to a near-end user and the text communication may be drafted to a far-end user, user 2. User 1's may want to know about the alert preferences of user 2. Thus, when user 1 is drafting the text communication, user 1 may request user 2's alert preferences. Alternatively, the alert preferences of user 2 may be provided automatically to user 1 as user 1 is drafting the text communication. User 1 may obtain the alert preferences of user 2 by other means or methods, such as accessing alert preferences stored on a server or in a database.

In step 406, user 1 is provided the far-end (also referred to as "receiving") user's (e.g., user 2's) alert preferences. As discussed herein, the alert preferences may be provided from a database or a server, or they may be retrieved in real-time as user 1 is drafting the communication, for example. In addition, alert preferences may be based on information provided by a presence server, such as an alert preference of a reduced alert as compared to the receiving user's alerting preferences if the user is at a work location as provided by the presence server. The alert preferences may be conveyed to the user, or displayed, in any form.

The user 1 may send the text communication with specified alerts in step 408. The user 1 may consider user 2's alert preference when specifying the alerts to use for the text communication, or the user 1 may not consider user 2's alert preferences when specifying the alerts to use for the text communication. User 1 may select any type of alert to use for the text communication. In the example of FIG. 4, user 1 sends the text communication with a visual alert and no audible alert. User 1 also configures the text communication so that user 2 will not receive any audible alert when the text communication arrives at the user device 404 (e.g., the text communication is received); however, when the user 2 opens the text dialogue window, then an audible alert indicating the receipt of the text communication will sound. When the text communication arrives at user 2's user device 404, having no audible alert may mean that the text communication does not sound any alert when it arrives at the user device of user 2. Also, the visual alert associated with the text communication may be any visual alert, such as a light that flashes on user 2's user device 404, a pop up visual message showing the text communication on user 2's user device 404, and a visual indication of a new communication on user 2's user device 404, or any combination of these or other visual alerts.

At step 410, the text communication having a visual and no audible alert is sent from user 1's user device 404 to user 2's user device 404, and at step 412, user 2 receives the text communication. At step 412, when user 2 receives the text communication, there is no audible alert on user 2's user device 404, but there is a visual alert that the text communication arrives at user 2's user device 404. The lack of audible alert is a lower level alert than what would otherwise sound by default when user 2 receives the text communication, based on the user 1 choosing the reduced alert for the text communication. At step 414, user 2 opens the text dialogue window on the user device 404 to view the text communication, and when the text dialogue window is opened, user 2's user device sounds an audible alert to notify user 2 of the text communication audibly. The audible alert may be any audible alert, for example, a specific type or volume set by user 1, or one that was preset by user 2 for text communications.

Figure 5:
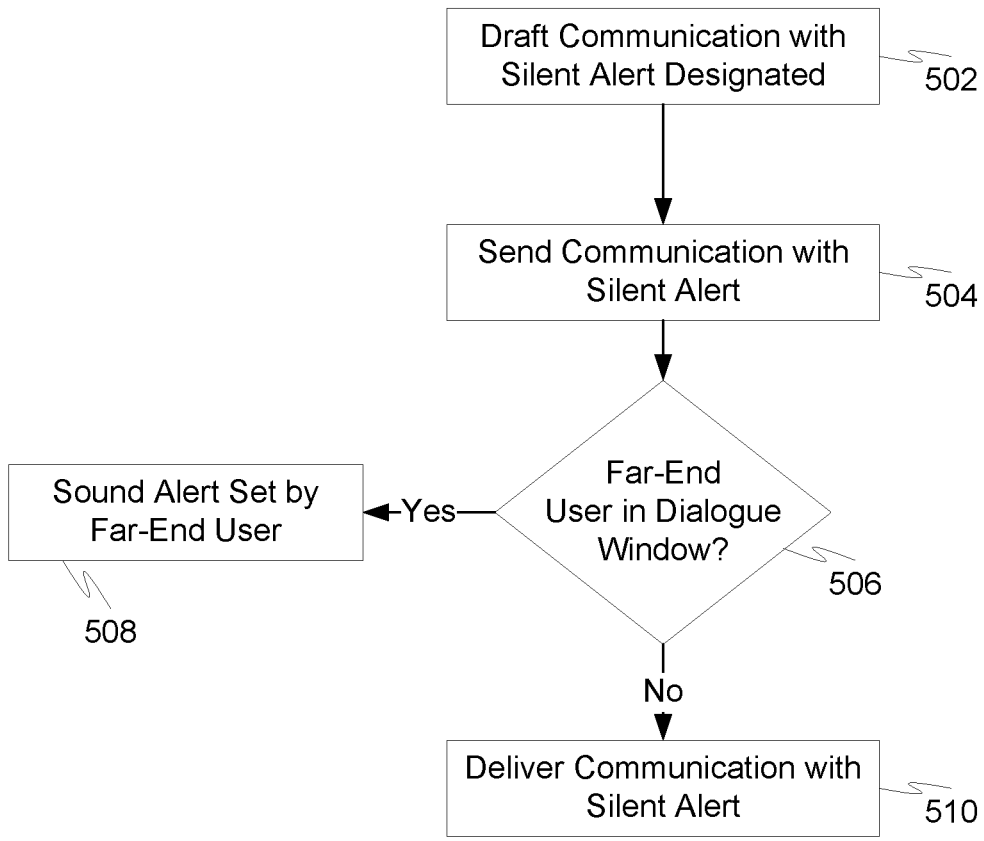
FIG. 5 is a logic flow chart according to an embodiment of the disclosure.

With reference now to FIG. 5, an exemplary logic flow chart will be described in accordance with at least some embodiments of the present invention. The method is initiated when a communication with a reduced alert as compared to the receiving user's alerting preferences is drafted at step 502. Users as stated herein may correspond to a near-end user (i.e., a user that is sharing the user device 4404 with the first user) or a far-end user (i.e., a user that is utilizing a different user device 4404 than the first user)). The user may designate a reduced alert in any manner when drafting the communication. Also, the user may have previously designated certain alerts to be used (e.g., have set alert profiles) for various situations, where the communication automatically has a reduced alert as compared to the receiving user's alerting preferences when drafted based on criteria that meets the previous designation. For example, the user drafting the communication at step 502 may have previously configured a setting that any communication sent to a far-end user must be set to a reduced alert as compared to the receiving user's alerting preferences if the location of the far-end user is at a certain location, as determined by a presence server. The reduced alert can be a lower level alert than what would otherwise sound by default when a far-end user receives the communication. When drafting the communication at step 502, the user sets the communication to have a reduced alert as compared to the receiving user's alerting preferences if the far-end user is not in the dialogue window when the communication is received at the user's device, but to sound whatever audible alert that was set by the far-end user if the far-end user is in the dialogue window when the communication is received at the user's device. User input can be received in voice, text, video, or combinations thereof.

At step 504, the communication is sent to a far-end user with the reduced alert as compared to the receiving user's alerting preferences, and in step 506, it is determined whether the far-end user is in a dialogue window associated with the communication. If the far-end user is in the dialogue window of the application that receives the communication when the communication is received, then the method proceeds to step 508 and the alert set by the far-end user for receipt of such a communication occurs. If the far-end user is not in the dialogue window of the application that receives the communication when the communication is received, then the method proceeds to step 510 and the reduced alert occurs.

Figure 6:
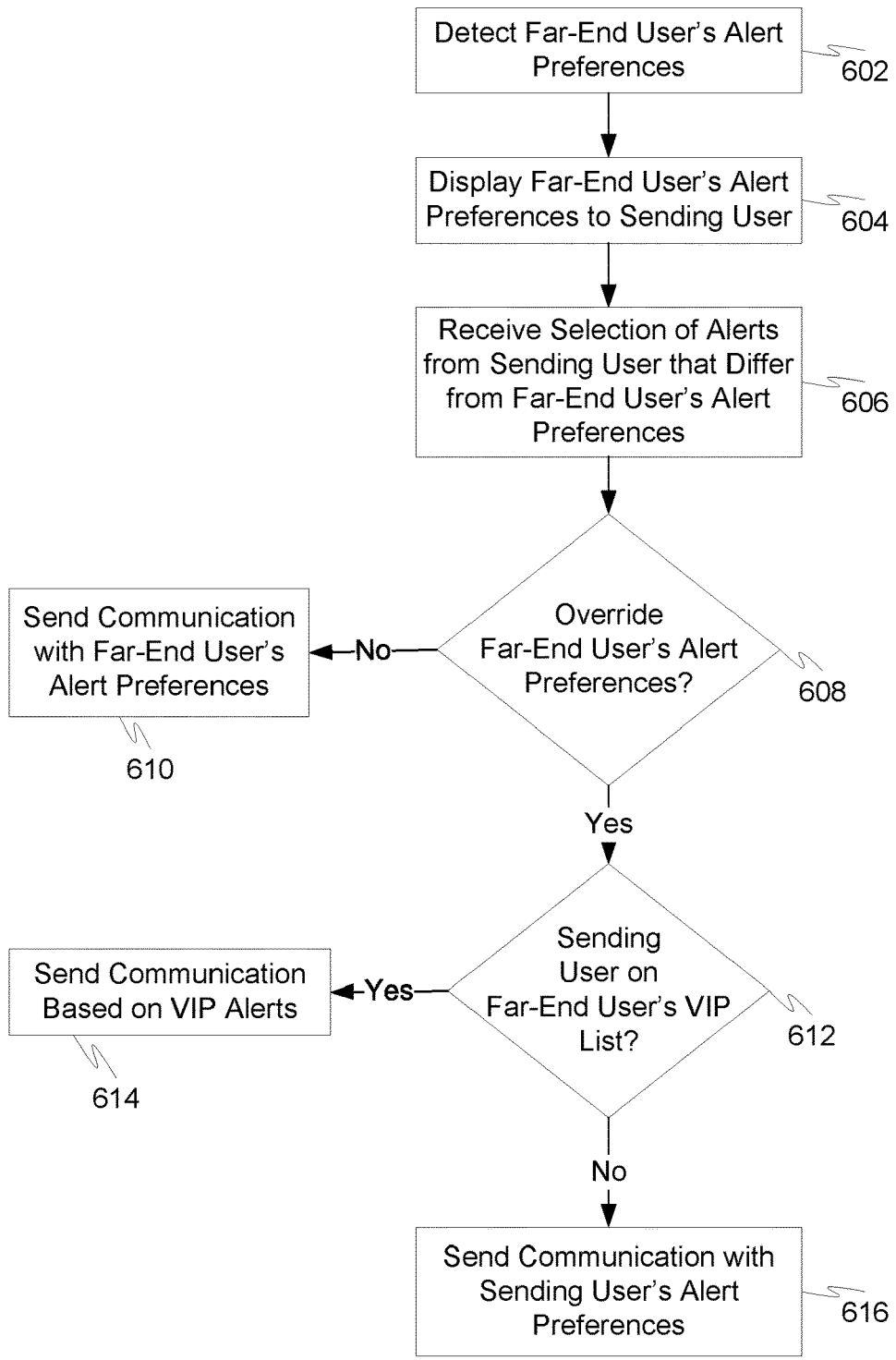
FIG. 6 is a logic flow chart according to an embodiment of the disclosure.

With reference now to FIG. 6, an exemplary logic flow chart will be described in accordance with at least some embodiments of the present invention. At step 602, a sending (e.g., near-end) user desires to send a communication to a far-end user and the near-end user opens an application on their user device that detects the far-end user's alert preferences. In some embodiments, an alert preference detector can determine a user's alert preferences (step 208). This step may also be performed by referring to locally stored alert type profiles to determine if the alert preferences for a user are locally available. If the desired information is not locally available, then the alert preference detector may request such data from a user's user device or from any other known source of such information. If such information cannot be obtained, then the alert preference detector may assume an alert preference for the second user based on one or more of (i) the location of the second user; (ii) the location of the user device 4404 being utilized by the second user; (iii) presence information of the second user (i.e., whether the second user is logged into any communication service and, if so, whether alert preferences for that second user are obtainable from the communication service); and the like.

In various embodiments, the system can determine, e.g., using the alert preference detector, whether there are any additional users that will be involved in the communication session. Such additional users may utilize their own user device or may be sharing a user device with the first or second user. If additional users are determined to be involved in the communication session, then the system may determine an additional user's alert preferences in a manner similar to that which was utilized to determine the user's alert preferences. If any alert preference difference exists between the users, then the system may accommodate for such differences, for example, by performing each step of the methods for each user independently.

The user device then displays the far-end user's alert preferences to the sending user at step 604. The far-end user's alert preference may be displayed in any manner to the sending user so that the sending user can select an alert to use for the communication when the communication is sent to the far-end user. At step 606, the system receives a selection of alerts for the communication that is set based on choices of the sending user, where the alerts that are set for the communication are different from a far-end user's alert preferences. For example, even though a far-end user may have their device set to sound a loud alert upon receipt of a communication, and the far-end user's alert preferences state that the far-end user prefers to have a loud alert sound when a communication is received, the sending user may set a quiet alert for the communication.

In step 608, the system may determine if the far-end user's alert preference(s) should be overridden. Such a determination may be made based on any criteria. If the systems determines that the far-end user's alert preferences should not be overwritten, then the system proceeds to step 610 and sends the communication with the far-end user's alert preferences. If the systems determines that the far-end user's alert preferences should be overwritten, then the system proceeds to step 612 and determines if the sending user is on the far-end user's Very Important Persons (VIP) list.

At step 612, the alerts that the communication is sent with may vary based on any criteria. For example, as in FIG. 6, the alerts for the communication may be set based on whether a user is on a VIP list so that any alert set or selected by a sending user or a far-end user are overwritten if the sending user is on the VIP list.

If the sending user is on the far-end user's VIP list, the system proceeds to step 614 and the communication is sent based on the VIP alerts. In other words, any alert set by the far-end user and any alert selected by the sending user are overwritten by alerts that correspond to alerts desired when a sender is on the VIP list. If the sending user is not on the far-end user's VIP list, the system proceeds to step 616 and the communication is sent based on the sending user's alert preferences.

The exemplary systems and methods of this disclosure have been described in relation to a distributed processing network. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital communications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a communications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub combinations, and/ or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
    configuring, by a microprocessor, a message for transmission from a sending user device to a recipient device;
    generating, by the microprocessor, a reduced message notification setting for the message, wherein the reduced message notification setting is defined by the sending user and provided as part of the message; and
    sending the message to the recipient device, wherein the reduced message notification setting is processed by the recipient device upon the recipient device receiving the message, and wherein, during processing of the reduced message notification, setting the recipient device performs a message notification action consistent with the reduced message notification setting.

2. The method of claim 1, wherein the message notification action is an audible alert that is quieter than a default audible alert set to sound by a receiving user of the recipient device upon receipt of the message.

3. The method of claim 2, wherein the message notification action is a haptic alert and wherein the message notification action further comprises a delayed visual alert, wherein the delayed visual alert occurs upon an application associated with viewing the message being accessed on the recipient device.

4. The method of claim 1, wherein the message notification action is a haptic alert only and a default audible alert set to sound by a receiving user of the recipient device upon receipt of the message does not sound upon the receipt of the message.

5. The method of claim 1, wherein the message notification action is a visual alert devoid of an audible alert, wherein the visual alert lights up a Light Emitting Diode.

6. The method of claim 1, wherein the method further comprises determining location information of the recipient device, and the defining of the reduced message notification setting is based on the location information.

7. The method of claim 6, wherein if the location information comprises a first location, the message notification action is a first type of alert, and if the location information comprises a second location distinct from the first location, the message notification action is a second type of alert.

8. The method of claim 7, wherein the first type of alert is a visual-only alert, and wherein the second type of alert is a haptic-only alert.

9. The method of claim 8, wherein the visual-only alert lights up a Light Emitting Diode on the recipient device upon receipt of the message.

10. The method of claim 1, further comprising accessing presence information of a second user, wherein the recipient device is associated with the second user, and wherein the defining of the reduced message notification setting is based on the presence information of the second user.

11. A system, comprising:
    one or more processors;
    memory storing one or more programs for execution by the one or more processors, the one or more programs comprising instructions for:

configuring a message for transmission from a sending user device to a recipient device;

generating a reduced message notification setting for the message, wherein the reduced message notification setting is defined by the sending user and provided as part of the message; and sending the message to the recipient device, wherein the reduced message notification setting is processed by the recipient device upon the recipient device receiving the message, and wherein, during processing of the reduced message notification, setting the recipient device performs a message notification action consistent with the reduced message notification setting.

12. The system of claim 11, wherein the message notification action is an audible alert that is quieter than a default audible alert set to sound by a receiving user of the recipient device upon receipt of the message.

13. The system of claim 11, wherein the message notification action is a haptic alert only and a default audible alert set to sound by a receiving user of the recipient device upon receipt of the message does not sound upon the receipt of the message.

14. The system of claim 11, wherein the message notification action is a visual alert devoid of an audible alert, wherein the visual alert lights up a Light Emitting Diode.

15. The system of claim 11, wherein the message notification action is a haptic alert and wherein the message notification action further comprises a delayed visual alert, wherein the delayed visual alert occurs upon an application associated with viewing the message being accessed on the recipient device.

16. The system of claim 11, wherein the method further comprises determining location information of the recipient device, and the defining of the reduced message notification setting is based on the location information.

17. The system of claim 16, wherein if the location information comprises a first location, the message notification action is a first type of alert, and if the location information comprises a second location distinct from the first location, the message notification action is a second type of alert.

18. The system of claim 17, wherein the first type of alert is a visual-only alert, and wherein the second type of alert is a haptic-only alert.

19. The system of claim 11, further comprising accessing presence information of a second user, wherein the recipient device is associated with the second user, and wherein the setting of the reduced message notification setting is based on the presence information of the second user.

20. A tangible and non-transient computer readable medium comprising microprocessor executable instructions that, when executed by the microprocessor, perform at least the following functions:

configure a message for transmission from a sending user device to a recipient device;

generate a reduced message notification setting for the message, wherein the reduced message notification setting is defined by the sending user and provided as part of the message; and send the message to the recipient device, wherein the reduced message notification setting is processed by the recipient device upon the recipient device receiving the message, and wherein, during processing of the reduced message notification, setting the recipient device performs a message notification action consistent with the reduced message notification setting.

* * * * *